(12) United States Patent
Baeumchen et al.

(10) Patent No.: US 8,523,192 B2
(45) Date of Patent: Sep. 3, 2013

(54) METHOD AND SYSTEM FOR OPERATING A MOTOR VEHICLE

(75) Inventors: Yvonne Baeumchen, Duisburg (DE); Michael Seemann, Cologne (DE); Marc Suermann, Duisburg (DE); Markus Schommer, Friedrichsthal (DE); Uwe Hoffmann, Leverkusen (DE); Russ Lee Norton, Brownstown Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 13/051,260

(22) Filed: Mar. 18, 2011

(65) Prior Publication Data
US 2011/0233881 A1 Sep. 29, 2011

(30) Foreign Application Priority Data
Mar. 24, 2010 (DE) .......................... 10 2010 003 205

(51) Int. Cl.
*B60G 17/06* (2006.01)
*B60G 17/02* (2006.01)

(52) U.S. Cl.
USPC .................. 280/5.515; 280/5.502; 280/5.506; 280/5.507

(58) Field of Classification Search
USPC ...................... 280/5.515, 5.502, 5.506, 5.507
See application file for complete search history.

(56) References Cited

U.S. PATENT DOCUMENTS

| | | | | |
|---|---|---|---|---|
| 6,502,837 B1* | 1/2003 | Hamilton et al. | .......... | 280/5.515 |
| 6,684,140 B2* | 1/2004 | Lu | .................. | 701/37 |
| 8,041,479 B2* | 10/2011 | Buma | ............. | 701/37 |
| 8,086,371 B2* | 12/2011 | Furuichi et al. | ................. | 701/37 |
| 2012/0029770 A1* | 2/2012 | Hirao et al. | ..................... | 701/38 |
| 2012/0053791 A1* | 3/2012 | Harada | ............................ | 701/38 |
| 2012/0305348 A1* | 12/2012 | Katayama et al. | ......... | 188/266.2 |

FOREIGN PATENT DOCUMENTS

| | | |
|---|---|---|
| DE | 10038074 A1 | 4/2001 |
| DE | 10327593 A1 | 1/2004 |

* cited by examiner

*Primary Examiner* — Drew Brown
(74) *Attorney, Agent, or Firm* — Julia Voutyras; Alleman Hall McCoy Russell & Tuttle LLP

(57) ABSTRACT

A method and system for operating a motor vehicle is described. In one example, spring rates for suspension springs and damping rates for shock absorbers are adjusted in response to vertical acceleration, longitudinal angular acceleration, and lateral angular acceleration of a vehicle body in the absence of accelerometers. The system and method may improve vehicle driving dynamics and lower system cost as compared to other systems.

19 Claims, 8 Drawing Sheets

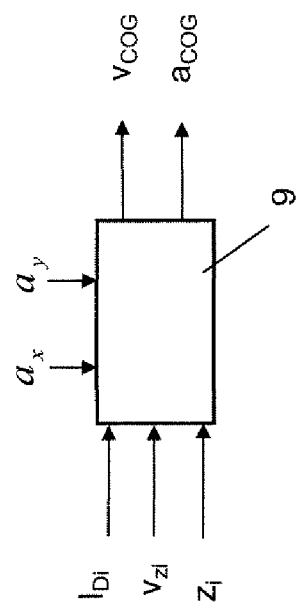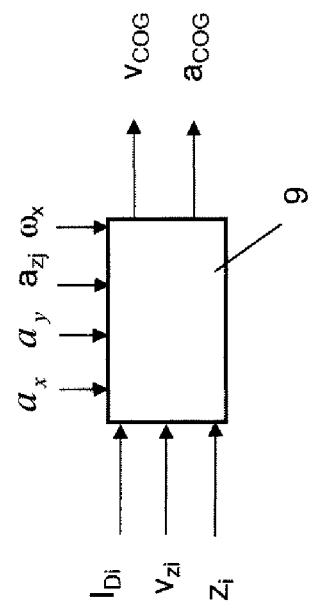
FIG. 8
FIG. 9

METHOD AND SYSTEM FOR OPERATING A MOTOR VEHICLE

RELATED APPLICATIONS

This application claims priority to German Patent Application Serial No. DE102010003205.0, filed on Mar. 24, 2010, the entire contents of which being incorporated herein by reference.

BACKGROUND/SUMMARY

The present description relates to a method for determining the vertical acceleration, the longitudinal angular acceleration and the lateral angular acceleration of a body. The body may be, in particular, a motor vehicle. The description further relates to a wheel suspension system and to a motor vehicle.

In order to reduce the susceptibility of technical equipment to degradation it may desirable that a technical function can be performed with a number of components as small as possible. For example, a motor vehicle, in particular the wheel suspension system of a motor vehicle, typically includes a multiplicity of sensors. These are, inter alia, sensors for measuring the vertical acceleration of the motor vehicle, sensors for determining the horizontal acceleration of the motor vehicle and distance sensors. Typically, four sensors for measuring the distance of the body with respect to the chassis components attached to the wheels, three accelerometers for determining the vertical acceleration of the motor vehicle and at least two accelerometers for determining the horizontal acceleration of the motor vehicle are used to determine the vertical acceleration, the longitudinal angular acceleration and the lateral angular acceleration of the motor vehicle.

Determination of the vertical acceleration, the longitudinal angular acceleration and the lateral angular acceleration at the center of gravity of the motor vehicle is of particular importance in connection with optimum control of the properties of the vehicle, especially control of the parameters of semi-active or active shock absorbers.

The design of the system for damping oscillations of the wheel suspension always represents a compromise between, on the one hand, screening the vehicle body from high-frequency oscillations (secondary ride) of the kind produced by road surface irregularities and, on the other, achieving a high level of driving comfort with regard to low-frequency oscillations of the vehicle body (primary ride). This means that, on the one hand, the vehicle body must be screened from high-frequency oscillations while on the other hand adequate control of the vehicle by the driver must thereby be assured, so that the driver receives feedback regarding the state of the vehicle and the road conditions.

Semi-active and active shock absorber systems can offer good screening from high frequencies generated by road surface irregularities while at the same time ensuring good control of the vehicle by the driver. In addition, the vehicle body can at the same time be screened from low frequencies produced by road surface irregularities.

Active damping systems have the disadvantage, as compared to passive damping systems, that they are considerably more complex and cost-intensive. In addition to the greater complexity of the hardware of the damper and the wheel suspension, as compared to conventional passive damping and wheel suspension systems, further sensors for executing the control and regulation algorithms of semi-active and active damping and wheel suspension systems are also required.

With regard to semi-active and active damping systems, the dynamics of the motion of the vehicle body are usually controlled with respect to low-frequency oscillations (primary ride). In the case of active damping systems, this is achieved by controlling the damping forces between the vehicle body and the four wheels. Variation of the damping forces is effected by the use of continuously adjustable shock absorbers.

In order to estimate the motion of the vehicle body, in particular in the context of active damping systems, three acceleration sensors fastened to the vehicle body are normally used. The measurement data of the acceleration sensors is used for calculating the accelerations of the vehicle body with respect to lift (heave) acceleration or vertical acceleration, roll acceleration or longitudinal angular acceleration, and pitch acceleration or lateral angular acceleration. In addition, the measurement data is integrated in order to determine the corresponding velocities. Additionally, the vertical deflections of the respective spring elements at the four corners of the vehicle are measured.

The inventors herein have recognized the above-mentioned disadvantages of cost and complexity and have developed a method for operating a vehicle, comprising: adjusting a damper in response to a vertical acceleration, a longitudinal angular acceleration, and a lateral angular acceleration provided via a mass of a vehicle body, two moments of inertia of the vehicle body, positions of a plurality of shock absorbers relative to a center of gravity of the vehicle body, a mean height of a longitudinal axis of rotation of the vehicle body, a mean height of a transverse axis of rotation of the vehicle body, damping forces of the plurality of shock absorbers, and spring forces of a plurality of spring elements coupled to the vehicle body.

By calculating the vertical acceleration, longitudinal angular acceleration, and lateral angular acceleration from the positions of a plurality of shock absorbers, the damping forces of the plurality of shock absorbers, vehicle inertia, and spring forces it may be possible to eliminate three axis accelerometers for controlling the suspension of a vehicle. Eliminating accelerometers can reduce system cost and lower the possibility of system degradation since fewer components may be used to control the vehicle suspension.

The present description may provide several advantages. Specifically, the approach may reduce system cost by reducing the number of system components. Further, a lower number of system components may reduce the possibility of system degradation since fewer components are relied upon to operate the system. Further still, the approach may allow for easier installation of the system to a vehicle since fewer components have to be installed to the vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 8 shows schematically the input and output data of the motion-determining unit 9 according to a first variant of the inventive method; and FIG. 9 shows schematically the input and output data of the motion-determining unit 9 according to a second variant of the inventive method.

DETAILED DESCRIPTION

Figure 1:
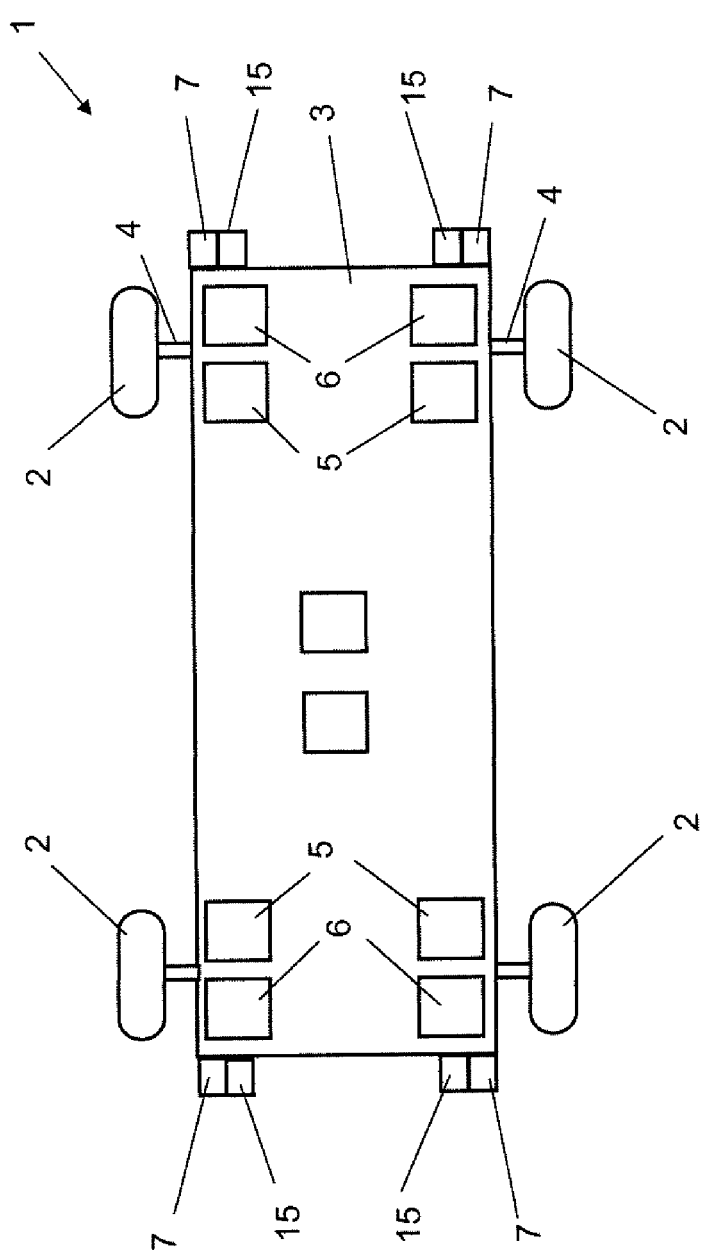
FIG. 1 shows schematically a part of a motor vehicle.
Figure 2:
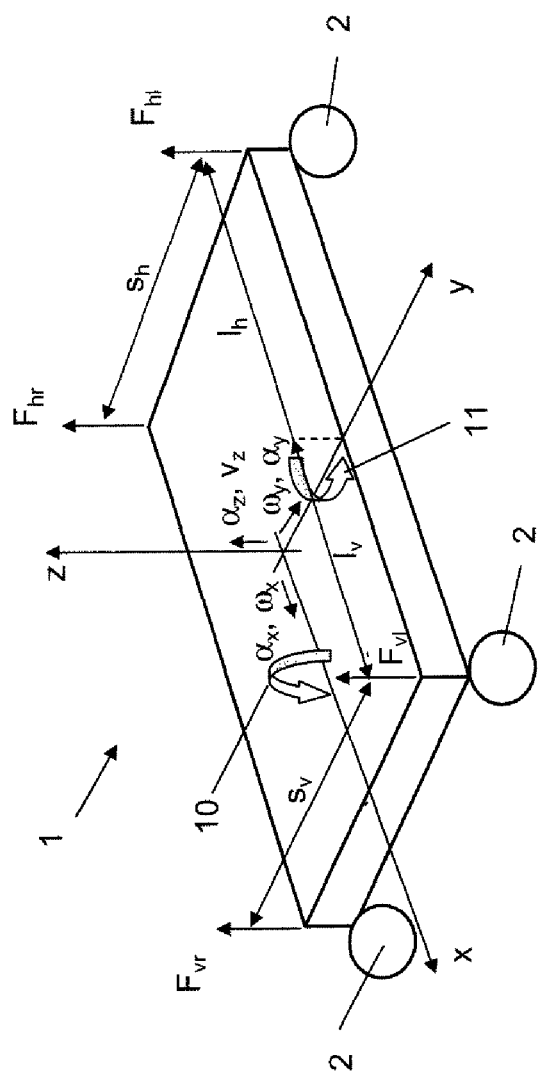
FIG. 2 shows schematically the geometry used for the motor vehicle.
Figure 3:
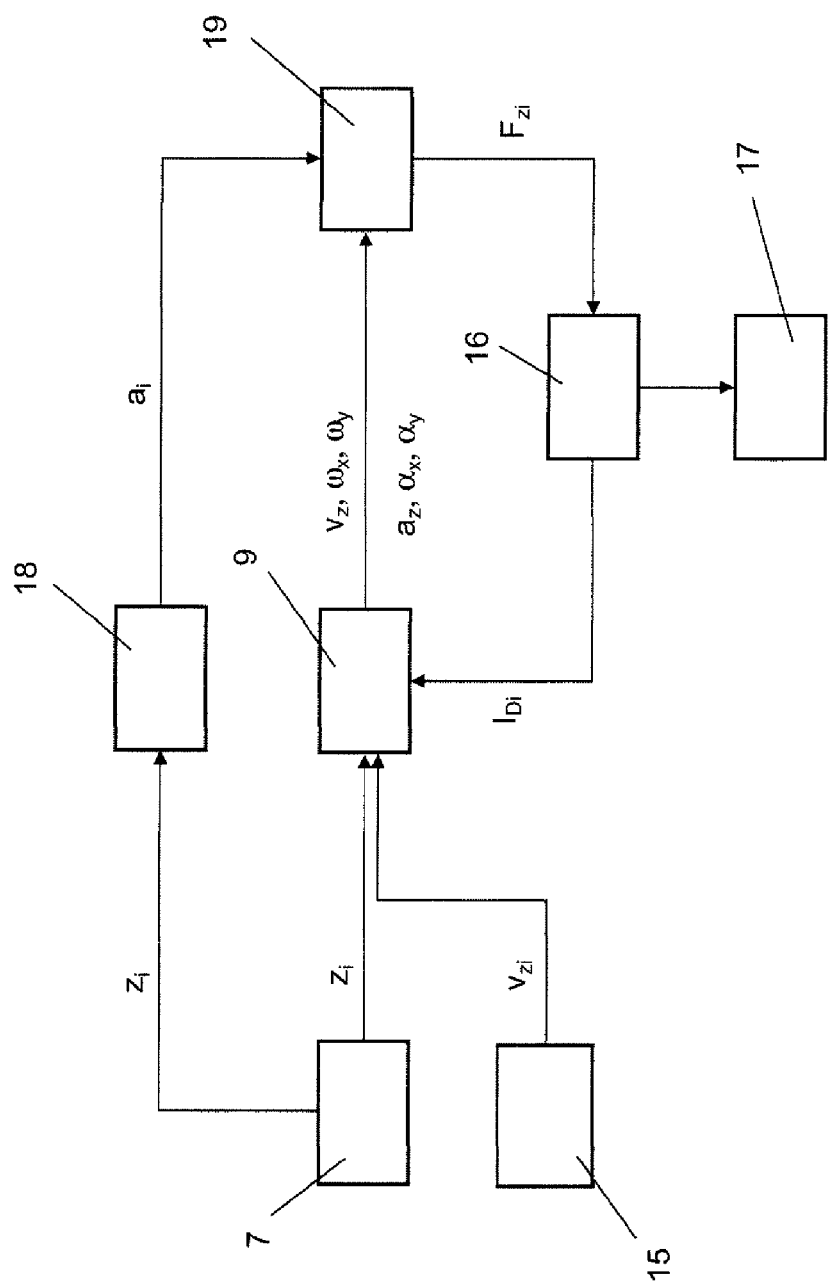
FIG. 3 shows schematically the operation of the shock absorber control system of the vehicle.
Figure 4:
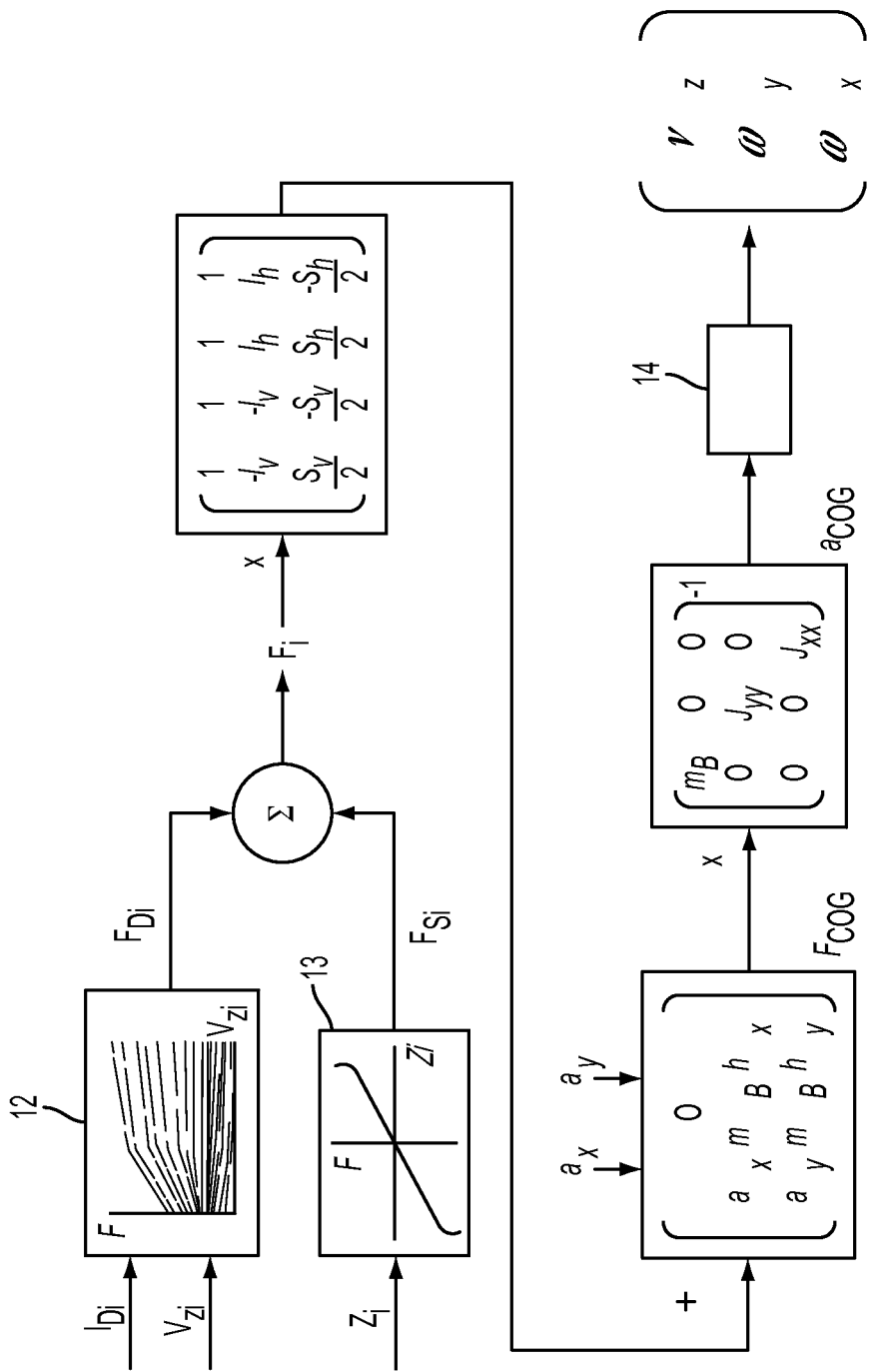
FIG. 4 shows schematically the method for determining the vertical acceleration, the longitudinal angular acceleration and the lateral angular acceleration of the vehicle.

The present description is related to a system for controlling a suspension of a vehicle. FIGS. 1 and 2 show an example vehicle suspension systems and geometry. FIGS. 3 and 4 show methods for controlling a vehicle suspension. The methods of FIGS. 3 and 4 operate according to the prophetic examples of FIGS. 5, 6, and 7. Finally, FIGS. 8 and 9 show example system inputs for determining vehicle body acceleration.

The present description provides for a method for determining the vertical acceleration, the longitudinal angular acceleration and the lateral angular acceleration of a body. The description also provides for making available an advantageous wheel suspension system. The description further provides for making available an advantageous motor vehicle.

In one example, the description provides for a method for determining the vertical acceleration, the longitudinal angular acceleration and the lateral angular acceleration of a body. The method according to the description for determining the vertical acceleration, the longitudinal angular acceleration and the lateral angular acceleration of a body relates to a body which has a longitudinal axis of rotation, a transverse axis of rotation, at least three spring elements, at least three shock absorbers and at least three height sensors. One height sensor is arranged in the region of a respective shock absorber in each case. The method is distinguished by the following steps: First, the damping forces of the shock absorbers, the spring forces of the spring elements, the center of gravity of the body, the mass of the body, the moments of inertia of the body, the positions of the shock absorbers in relation to the center of gravity of the body, the mean height of the longitudinal axis of rotation and the mean height of the transverse axis of rotation are determined, for example measured or ascertained from other values. The vertical acceleration, the longitudinal angular acceleration and the lateral angular acceleration are then determined with the aid of the mass of the body, the moments of inertia of the body, the positions of the shock absorbers in relation to the center of gravity of the body, the mean height of the longitudinal axis of rotation, the mean height of the transverse axis of rotation, the damping forces of the shock absorbers and the spring forces of the spring elements. The longitudinal axis of rotation and the transverse axis of rotation may be, in particular, imaginary axes of rotation of the body. The body may advantageously be a motor vehicle.

As discussed above, and compared to the above-described conventional methods for determining the velocities and accelerations at the center of gravity of the body, in particular of the motor vehicle, the method according to the description has the advantage that the above-mentioned three vertical acceleration sensors are not required. In this way, three sensors can be dispensed with, whereby the susceptibility of the system to degradation is reduced while functionality remains the same.

In the case of a motor vehicle, the vertical acceleration may also be the heave acceleration. The longitudinal angular acceleration may in this case also be the roll acceleration, and the lateral angular acceleration may in this case also be the pitch acceleration.

In addition, the longitudinal acceleration of the body and the lateral acceleration of the body may advantageously be determined, for example measured or calculated. This determination may be carried out either by direct measurement with correspondingly oriented acceleration sensors, or indirectly via differentiation in the time domain of the longitudinal and/or lateral velocity signals present. The vertical acceleration, the longitudinal angular acceleration and the lateral angular acceleration may then be determined with the aid of the mass of the body, the moments of inertia of the body, the positions of the shock absorbers in relation to the center of gravity of the body, the mean height of the longitudinal axis of rotation, the mean height of the transverse axis of rotation, the damping forces of the shock absorbers, the spring forces of the spring elements, the longitudinal acceleration of the body and the lateral acceleration of the body.

Furthermore, the vertical velocity, the longitudinal angular velocity and the lateral angular velocity of the body may be determined with the aid of the vertical acceleration, the longitudinal angular acceleration and the lateral angular acceleration. This determination may be carried out, in particular, by integration.

In the case of a motor vehicle, the vertical velocity may also be the heave velocity. The longitudinal angular velocity may in this case also be the roll velocity and the lateral angular velocity may in this case also be the pitch velocity.

In addition, the method according to the description may be configured in such a manner that the vertical deflections of the spring elements are measured. The damping currents of the shock absorbers may be determined, for example measured or calculated. Furthermore, the velocities of the vertical deflections of the spring elements may be determined, for example by means of differentiation of the vertical deflection signal in the time domain. In principle, the velocities of the vertical deflections of the spring elements may be calculated or measured. In addition, the spring constants of the spring elements and the damping curves of the shock absorbers may be determined. The damping forces of the shock absorbers may then be determined with the aid of the damping currents of the shock absorbers, the velocities of the vertical deflections of the spring elements and the damping curves of the shock absorbers. The spring forces of the spring elements may be determined with the aid of the vertical deflections of the spring elements and the spring constants of the spring elements.

The body, in particular the motor vehicle, advantageously includes four shock absorbers and four height sensors. In the context of the present description, a height sensor is understood to be a distance sensor with the aid of which the distance between a body and a chassis element can be measured. A respective height sensor is advantageously arranged in the region of each shock absorber.

The body may be, for example, a motor vehicle which includes a number of wheels, advantageously four wheels, and at least one wheel suspension system equipped with shock absorbers. In this case at least one height sensor may be arranged in the region of a respective wheel in each case.

The calculations within the framework of the inventive method are based on data relating to the properties of the shock absorbers and of the spring elements, the geometry of the vehicle, in particular the wheelbase and track width, Newton's second law and the inverse mass matrix.

The input signals are, for example, the vertical deflections $z_i$ of the spring elements and the velocities of the vertical deflections $v_{zi}$ of the spring elements as signals from the height sensors, the actual damping current ($I_{Di}$) of each shock absorber and the longitudinal linear acceleration $a_x$ and the lateral linear acceleration $a_y$ from a bus system, in particular a CAN bus (Controller Area Network, asynchronous serial bus system). First, the forces $F_i$ at the corners of the vehicle may be calculated from the damping forces $F_{Di}$ of the shock absorbers and from the spring forces $F_{Si}$ of the spring elements.

In principle, the spring elements may be configured to be passive or active. In the first example, the respective spring force $F_{Si}$ may be calculated from the vertical deflection $z_i$ of the respective spring element and the spring constant $c_i$ of the spring element. In the second example the spring constant is adjustable or controllable, for example with the aid of an actuator or with the aid of a control current. In this case the respective spring force $F_{Si}$ may be calculated from the vertical deflection $z_i$ of the respective spring element and, for example, from the control current for adjusting the respective spring constant of the spring element.

The damping forces $F_{Di}$ of the shock absorbers may be calculated from the current damping currents $I_{Di}$, from the velocities of the vertical deflections $v_{zi}$ of the spring elements and from the respective damping curves of the shock absorbers. In principle, the shock absorbers may be configured to be passive or active dampers. In the first example, the dependence of the damping force $F_{Di}$ on the vertical deflection velocity $v_{zi}$ of the respective spring element is determined by means of a characteristic curve. In the second example, the damping force $F_{DI}$ is dependent on the vertical deflection velocity $v_{zi}$ of the respective spring element and additionally on the respective damping current $I_{Di}$, for example, on the current controlling an active valve of the damper. That is to say that the dependence of the damping force $F_{Di}$ on the vertical deflection velocity $v_{zi}$ of the respective spring element is determined by means of a characteristic curve dependent on the respective damping current $I_{Di}$.

The sum of the damping force $F_{Di}$ and the spring force $F_{Si}$ yields the force $F_i$ acting vertically on the respective corner of the vehicle, according to:

$$F_i = F_{Si}(z_i, c_i) + F_{Di}(I_{Di}, V_{zi}).$$

The forces acting on the center of gravity of the body, for example of the vehicle, may be calculated using the geometry of the body. In the case of a vehicle, this geometry may be the wheelbase $l_v$, $l_h$ and the track width $s_f$, $s_h$ (cf. FIG. 2). In addition, the forces are determined with the aid of the longitudinal linear acceleration $a_x$, the lateral linear acceleration $a_y$, the sprung mass of the vehicle $m_B$, the height of the longitudinal axis of rotation $h_x$ and the height of the transverse axis of rotation $h_y$:

$$F = F_i * \begin{pmatrix} 1 & 1 & 1 & 1 \\ -l_v & -l_v & l_h & l_h \\ \frac{s_v}{2} & -\frac{s_v}{2} & \frac{s_h}{2} & -\frac{s_h}{2} \end{pmatrix} + \begin{pmatrix} 0 \\ a_x m_B h_x \\ a_y m_B h_y \end{pmatrix}.$$

In order to ascertain the vertical acceleration, in particular the heave acceleration, the longitudinal angular acceleration, in particular the roll acceleration, and the lateral angular acceleration, in particular the pitch acceleration—that is, the accelerations at the center of gravity $a_{COG}$ of the vehicle—the force F may be multiplied by the inverse mass matrix:

$$a_{COG} = F * \begin{pmatrix} m_B & 0 & 0 \\ 0 & J_{yy} & 0 \\ 0 & 0 & J_{xx} \end{pmatrix}^{-1}.$$

$J_{xx}$ and $J_{yy}$ denote the moments of inertia of the vehicle. Low frequency interference may advantageously be filtered out for the longitudinal angular acceleration and the lateral angular acceleration using, for example, a discrete Butterworth 3 Hz high-pass filter.

Following the determination of the vertical acceleration, of the longitudinal angular acceleration and of the lateral angular acceleration, the damping currents of the shock absorbers and/or the spring constants of the spring elements, for example, may be adjusted as a function of the vertical acceleration, the longitudinal angular acceleration and the lateral angular acceleration which have been determined. Analogously, the damping currents of the shock absorbers and/or the spring constants of the spring elements, for example, may be adjusted as a function of the vertical velocity, the longitudinal angular velocity and the lateral angular velocity which have been determined. In this way, an adjustment of the shock absorbers and/or of the spring elements which is adapted to the prevailing conditions, for example the road conditions and the driving style, can be achieved.

Furthermore, the longitudinal angular velocity and/or an additional vertical acceleration outside the center of gravity of the body may be determined, in particular measured, in order to determine the lateral angular velocity of the body, and the vertical acceleration, the longitudinal angular acceleration and the lateral angular acceleration of the body may be determined with the aid of the longitudinal angular velocity and/or of the additional vertical acceleration outside the center of gravity of the body. In this way, in comparison to the above-described procedure, more accurate results can be achieved, especially in an application in the context of a semi-active damping system. In the case of a motor vehicle, the longitudinal angular velocity (roll rate) and/or the additional vertical acceleration of another component of the motor vehicle, for example the airbag system, may advantageously be obtained.

The wheel suspension system according to the description can be connected to a body, for example a motor vehicle. The body includes an imaginary longitudinal axis of rotation and an imaginary transverse axis of rotation. The wheel suspension system comprises at least three spring elements, at least three height sensors, at least three shock absorbers and a motion-determining unit for determining the vertical acceleration, the longitudinal angular acceleration and the lateral angular acceleration.

In this example the motion-determining unit is configured in such a manner that the determination of the vertical acceleration, of the longitudinal angular acceleration and of the lateral angular acceleration is carried out solely with the aid of the damping forces of the shock absorbers, the spring forces of the spring elements, the mass of the body, the moments of inertia of the body, the positions of the shock absorbers in relation to the center of gravity of the body, the mean height of the longitudinal axis of rotation of the body and the mean height of the transverse axis of rotation of the body.

The motion-determining unit may preferably be configured in such a manner that the determination of the damping forces of the shock absorbers and of the spring forces of the spring elements is carried out with the aid of damping currents of the shock absorbers, the vertical deflection of the spring elements, the velocities of the vertical deflections of the spring elements, the spring constants of the spring elements and the damping curves of the shock absorbers.

In addition, the wheel suspension system according to the description may include a device for determining the lateral acceleration of the body and a device for determining the longitudinal acceleration of the body. The device for determining the lateral acceleration of the body and the device for determining the longitudinal acceleration of the body may be, for example, devices for measuring, calculating or detecting respectively the lateral and longitudinal linear acceleration of the body. In this example, the motion-determining unit may be configured in such a manner that the determination of the vertical acceleration, of the longitudinal angular acceleration and of the lateral angular acceleration is carried out solely with the aid of the damping forces of the shock absorbers, the spring forces of the spring elements, the lateral acceleration of the body, the longitudinal acceleration of the body, the mass of the body, the moments of inertia of the body, the positions of the shock absorbers in relation to the center of gravity of the body, the mean height of the longitudinal axis of rotation of the body and the mean height of the transverse axis of rotation of the body.

The body may preferably be a motor vehicle. Furthermore, the wheel suspension system may include a number of elements for securing wheels. A shock absorber and a height sensor may, in particular, be arranged in the region of these elements in each case. In the case of a motor vehicle, the vertical acceleration may also be the heave acceleration. The longitudinal angular acceleration may in this case also be the roll acceleration and the lateral angular acceleration may in this case also be the pitch acceleration. Correspondingly, the vertical velocity may also be the heave velocity. The longitudinal angular velocity may in this case also be the roll velocity and the lateral angular velocity may in this case also be the pitch velocity.

The motor vehicle according to the description includes a previously-described wheel suspension system according to the description. The motor vehicle according to the description has the same properties and advantages as the wheel suspension system according to the description. Furthermore, the motor vehicle may include a device for estimating road surface irregularities. With the aid of this device a control of the damping adapted to the situation, in particular a control of the shock absorbers adapted to the situation, can be implemented.

In total, the present description has the advantage that three sensors for measuring the vertical acceleration can be saved when determining the motion of the center of gravity of a body, in particular of a motor vehicle. In this way the susceptibility of the system to failure is reduced. At the same time the costs and complexity of the system are reduced, especially in the case when the motion of the center of gravity of the body is determined on the basis of the measured vertical deflections of the spring elements.

Further features, properties and advantages of the present description are described in more detail below with reference to an exemplary embodiment and to the appended figures.

Referring now to FIG. 1, it shows schematically a motor vehicle 1. The motor vehicle 1 includes a wheel suspension system 3 and four wheels 2. The wheels 2 are connected to the wheel suspension system 3 by means of a device for securing the wheels 4. The wheel suspension system 3 comprises four spring elements 5 which implement a suspension of the wheels, and four shock absorbers 6. One spring element 5 and one shock absorber 6 are arranged in the region of a respective wheel 2 in each case.

The motor vehicle 1 further includes four height sensors 7 which are each arranged in the region of a respective wheel 2, and four velocity sensors 15, which likewise are each arranged in the region of a respective wheel 2. In addition, the motor vehicle 1, or the wheel suspension system 3, includes a device for determining the lateral acceleration 8 and a motion-determining unit 9. The longitudinal acceleration is determined by means of differentiation in the time domain of the longitudinal velocity at the center of gravity of the vehicle. The motion-determining unit 9 may be in the form, for example, of a hardware component, in particular an application-specific integrated circuit (ASIC), or of a software module, in particular a CPU (Central Processing Unit).

By way of the height sensors 7, which are each arranged in the region of a respective wheel 2, the distance, for example, of the body from the wheels, or from the chassis elements connected to the wheels, can be measured. The vertical velocity for the corresponding change of distance of the vehicle body is determined by means of differentiation in the time domain of the signal of the height sensor 7, but may also be determined in each case by means of the velocity sensors 15, which are likewise each arranged in the region of a respective wheel 2.

Referring now to FIG. 2, it shows schematically the geometry, used in the following exposition, of the motor vehicle 1. A coordinate system with an X-axis, a Y-axis and a Z-axis is laid out through the motor vehicle 1. In this case, the X-axis points in the direction of travel of the motor vehicle 1. The Y-axis points in the direction of travel to the left and the Z-axis points upwards.

In consequence of the suspension and the shock absorbance, forces act on each corner of the motor vehicle 1. The force acting at the front right is the force $F_{vr}$, at the front left the force $F_{vl}$, at the rear right the force $F_{hr}$ and at the rear left the force $F_{hl}$. The distance between the front wheels 2 is denoted by $s_v$ (front track width). The distance between the rear wheels is denoted by $s_h$ (rear track width). Furthermore, the distance of the front axle from the center of gravity of the total system is denoted by $l_v$ and the distance of the rear axle from the center of gravity of the total system by $l_h$.

A possible rotation of the vehicle 1 about the X-axis is denoted by reference numeral 10. The corresponding angular velocity is denoted by $\omega_x$ and the corresponding angular acceleration is denoted by $\alpha_x$. In addition, a possible rotation about the Y-axis is denoted by an arrow 11. The corresponding angular velocity is denoted by $\omega_y$ and the corresponding angular acceleration by $\alpha_y$. Furthermore, the velocity of a deflection of the vehicle 1 in the z direction is denoted by $v_z$ and the corresponding acceleration by $a_z$.

Referring now to FIG. 3, it shows schematically the shock absorber control system of the motor vehicle 1. By means of the height sensors 7, the vertical deflections $z_i$ of the body in the region of the wheels 2, for example, are determined. The velocities of the respective deflections $v_{zi}$ are determined by means of a time differentiation of the signal of the height level sensor 7. The ascertained values $z_i$ (i=1-4) and $v_{zi}$ (i=1-4) are made available to the motion-determining unit 9. In addition, the respective damping current $I_{Di}$ (i=1-4) of the shock absorbers 6 is made available to the motion-determining unit 9 by a device for monitoring the damping current 16.

The motion-determining unit 9 ascertains from the data fed into it the vertical velocity $v_z$, the vertical acceleration $a_z$, the longitudinal angular velocity $\omega_x$, the longitudinal angular acceleration $\alpha_x$, the lateral angular velocity $\omega_y$ and the lateral angular acceleration $\alpha_y$. This data is used, for example in the context of a damping control device 19 (e.g., a controller including inputs and outputs along with instructions), to calculate the lateral forces $F_{zi}$ (i=1-4) acting in each case in the region of the wheels 2. In some examples, the motion-determining unit 19 and the damping control device may be combined in a single controller including inputs, outputs, and instructions for performing assigned tasks and functions described herein. The forces $F_{zi}$ acting are the forces $F_{vr}$, $F_{vl}$, $F_{hr}$ and $F_{hl}$ shown in FIG. 2. The values ascertained for these forces are then made available to the device for monitoring the damping current 16. According to the parameters specified, the respective damping current $I_{Di}$ may now be changed as a function of the forces $F_{zi}$ determined. Furthermore, parameters of a damping system 17 may be set or changed correspondingly.

The motor vehicle 1 may additionally include a device for estimating road surface irregularities 18. The deflections $z_i$ measured by means of the height sensors 7 may be fed into this device 18. In addition, the velocities and accelerations ascertained by means of the motion-determining unit 9 may also be fed into the device for estimating road surface irregularities 18. The device for estimating road surface irregularities 18 may in turn determine the respective accelerations $a_i$ (i=1-4) in the region of the wheels 2 and make these values available to the damping control device 19, for example.

Referring now to FIG. 4, it shows schematically the method for determining the velocities and accelerations at the center of gravity of the motor vehicle 1 with the aid of the motion-determining unit 9. The motion-determining unit 9 has at its disposal damping curves 12 for each shock absorber 6, values for the spring constants 13 for each shock absorber 6, the value of the mass $m_B$ of the motor vehicle 1, the values of the moments of inertia $J_{yy}$ and $J_{xx}$ of the motor vehicle 1, information on the position of the shock absorbers 6 in relation to the center of gravity of the total system $l_v$, $l_h$, $s_v$, $s_h$, or data on the positions of the shock absorbers 6 in relation to the center of gravity of the motor vehicle 1. In some examples, the mass $m_B$ of the motor vehicle 1 may be revised or adjusted at various times in a drive cycle. For example, when the vehicle is stopped, the braking force and distance to stop may be used to recomputed the mass $m_B$ of the motor vehicle 1 according to Newton's law of motion (e.g., F=ma or T=j$\omega$). Alternatively, the engine torque used to accelerate the vehicle may be used to compute the mass $m_B$ of the motor vehicle 1. The following measurement values are fed into the motion-determining unit 9: the damping currents $I_{Di}$, the deflections $z_i$, the velocities of the deflections $v_{zi}$, the longitudinal linear acceleration $a_x$ and the lateral linear acceleration $a_y$.

The damping forces $F_{Di}$ (i=1-4) are first determined with the aid of the measured damping currents $I_{Di}$, of the measured vertical deflection velocities $v_{zi}$ and of the damping curves 12 for each shock absorber. In addition, the spring forces $F_{Si}$ acting in each case are determined with the aid of the measured deflections $z_i$ and the respective spring constants 13.

Then the force $F_i$ (i=1-4) acting vertically on each wheel 2 is calculated from the sum of the respective damping force $F_{Di}$ ascertained and the respective spring force $F_{Si}$.

From the vector formed from the forces $F_i$, namely $F_{vl}$, $F_{vr}$, $F_{hl}$, $F_{hr}$, the cross product is formed with the matrix $$\begin{pmatrix} 1 & 1 & 1 & 1 \\ -l_v & -l_v & l_h & l_h \\ \frac{s_v}{2} & \frac{-s_v}{2} & \frac{s_h}{2} & \frac{-s_h}{2} \end{pmatrix}$$

and then the vector $$\begin{pmatrix} 0 \\ a_x m_B h_x \\ a_y m_B h_y \end{pmatrix}$$

is added. In this way, the force $F_{COG}$ acting on the center of gravity of the motor vehicle 1 is obtained in the result. The vector from the corresponding force components is then multiplied by the matrix $$\begin{pmatrix} m_B & 0 & 0 \\ 0 & J_{yy} & 0 \\ 0 & 0 & J_{xx} \end{pmatrix}^{-1}.$$

In this way, the acceleration at the center of gravity $a_{COG}$ of the motor vehicle 1 or of its components, namely the vertical acceleration $a_z$, the longitudinal angular acceleration $\alpha_x$ and the lateral angular acceleration $\alpha_y$ of the motor vehicle 1, is determined. From these acceleration components the velocity at the center of gravity or of its components, namely the vertical velocity $v_z$, the longitudinal angular velocity $\omega_x$ and the lateral angular velocity $\omega_y$ of the motor vehicle, may be determined, for example with the aid of a pseudo-integrator 14.

Figure 5:
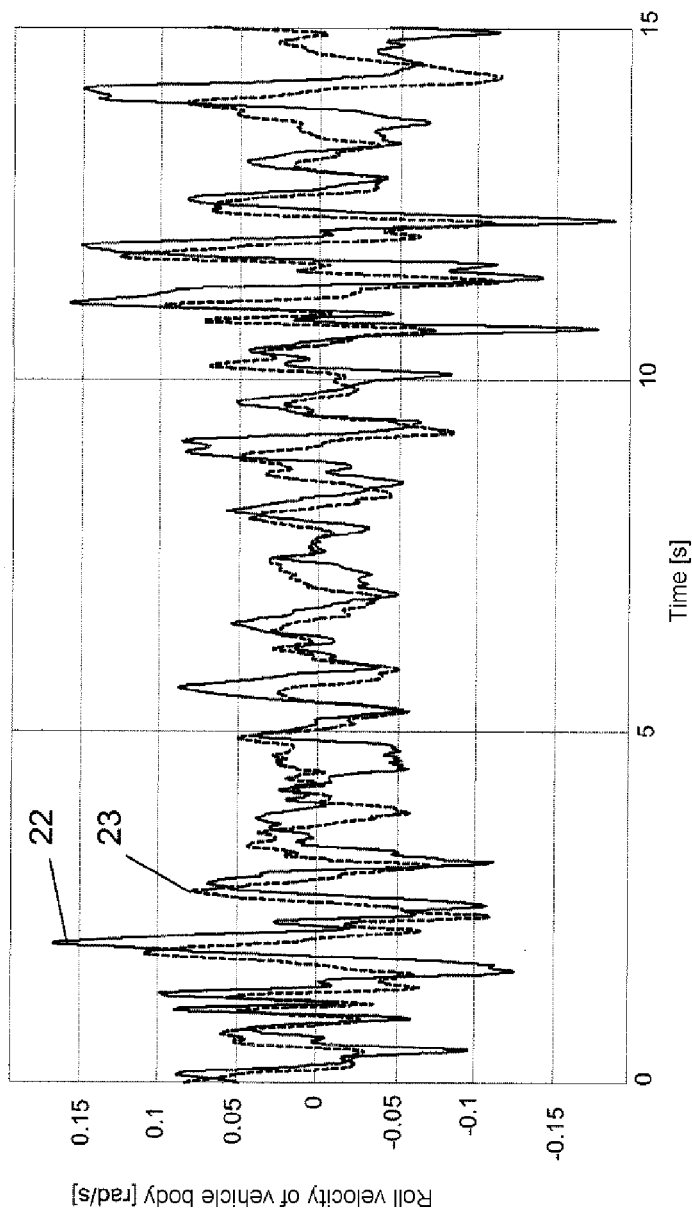
FIG. 5 shows in an exemplary manner the longitudinal angular velocity (roll velocity) as a function of time.
Figure 6:
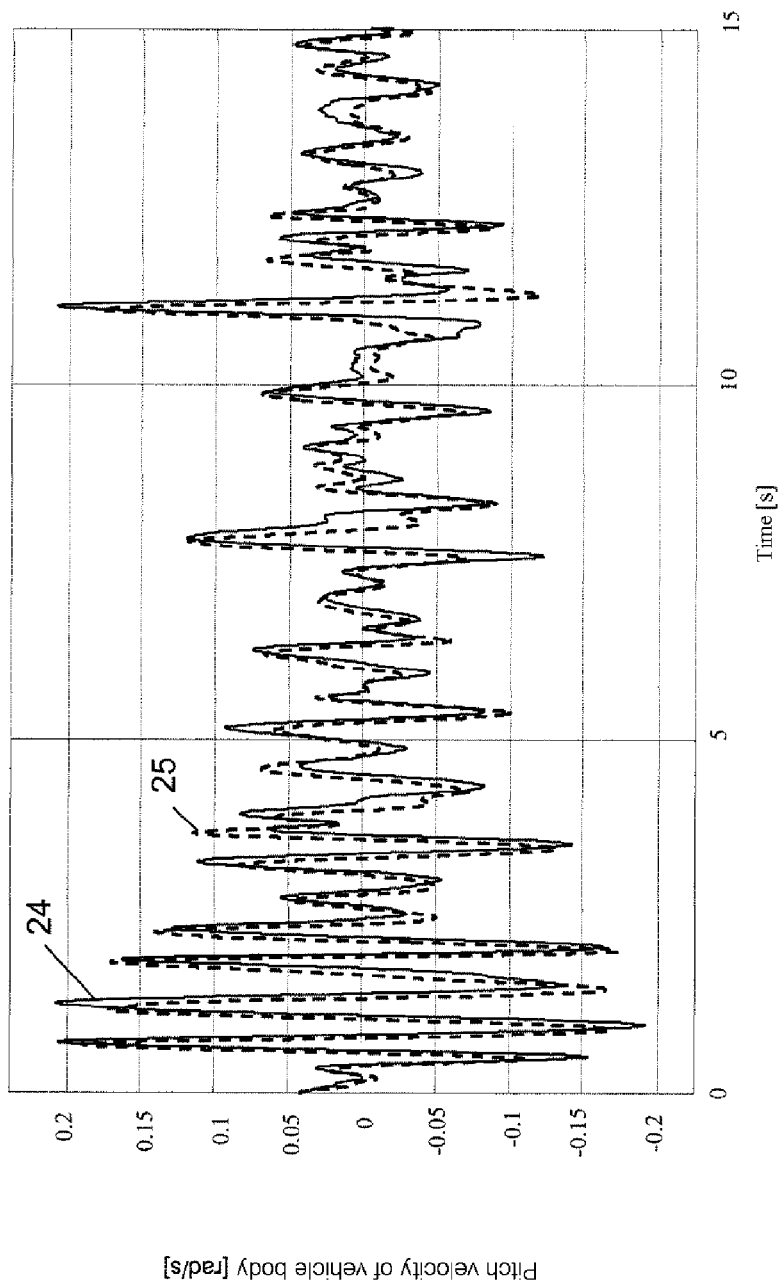
FIG. 6 shows in an exemplary manner the lateral angular velocity (pitch velocity) as a function of time.
Figure 7:
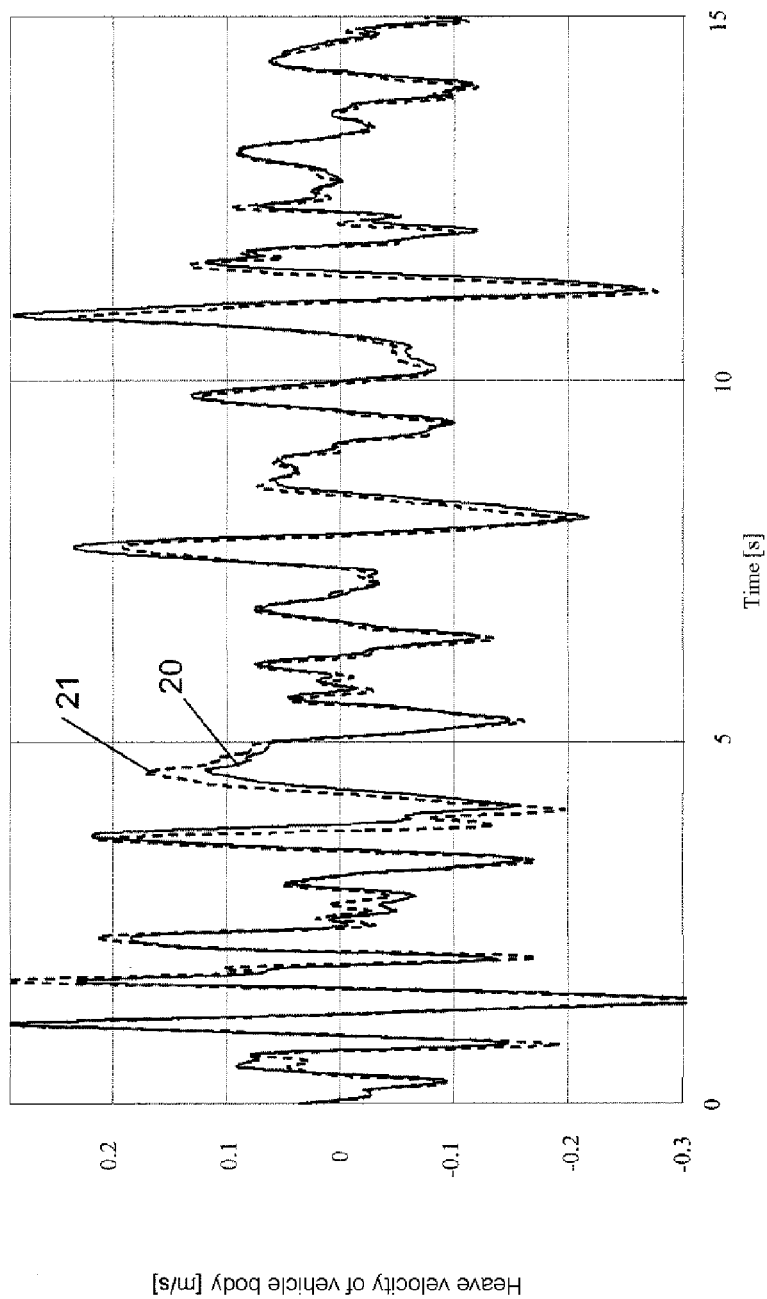
FIG. 7 shows in an exemplary manner the vertical velocity (heave velocity) as a function of time.

In the following exposition, the results of the method according to the description are compared to corresponding measurements taken with the aid of vertical acceleration sensors. FIG. 5 shows in an exemplary manner the longitudinal angular velocity (roll velocity) as a function of time. FIG. 6 shows in an exemplary manner the lateral angular velocity (pitch velocity) as a function of time. FIG. 7 shows in an exemplary manner the vertical velocity (heave velocity) as a function of time. In FIGS. 5 to 7, time is plotted in s on the X-axis in each case. The corresponding velocity in rad/s or m/s is plotted on the Y-axis in each case. In all three figures the curves in broken lines denote the velocities determined with the aid of vertical acceleration sensors and the continuous curves denote the velocities determined with the aid of the method according to the description.

In FIG. 7 the vertical velocities 21 determined with the aid of vertical acceleration sensors agree very well with the vertical velocities 20 determined with the aid of the method according to the description. In FIG. 6, the agreement between the lateral angular velocities 25 determined with the aid of vertical acceleration sensors and the lateral angular velocities 24 determined with the aid of the inventive method is relatively good, even though the deviations are somewhat larger than in FIG. 7. In FIG. 5, although the longitudinal angular velocities 22 determined with the aid of the method according to the description agree in their basic course with the longitudinal angular velocities 23 determined with the aid of vertical acceleration sensors, considerable deviations are nevertheless apparent in detail.

In order to achieve greater accuracy, therefore, it is advantageous to determine or measure the longitudinal angular velocity (roll velocity) separately, for example using a velocity sensor. Accuracy can be further increased by additionally or alternatively determining the lateral angular velocity (pitch velocity) separately. For this purpose data measured or determined, for example, within the framework of an airbag system—for example the pitch velocity measured within this framework13 may be used. A further variant consists in additionally determining a vertical acceleration outside the center of gravity of the vehicle and using this to calculate the lateral angular velocity (pitch velocity). The different variants are represented schematically in FIGS. 8 and 9.

Referring now to FIG. 8, it shows schematically the input and output data of the motion-determining unit 9 according to a first variant of the inventive method. In this case, the motion-determining unit 9 determines the velocity at the center of gravity $v_{COG}$ and the acceleration at the center of gravity $a_{COG}$ with the aid of the damping currents $I_{Di}$, the vertical deflections $z_i$, the velocities of the vertical deflections $v_{zi}$, the longitudinal linear acceleration $a_x$ and the lateral linear acceleration $a_y$. In this case, the velocity at the center of gravity $v_{COG}$ is formed from the vertical velocity $v_z$ (heave velocity), the longitudinal angular velocity $\omega_x$ (roll velocity) and the lateral angular velocity $\omega_y$ (pitch velocity). Analogously, the acceleration at the center of gravity $a_{COG}$ is formed from the vertical acceleration $a_z$ (heave acceleration), the longitudinal angular acceleration $\alpha_x$ (roll acceleration) and the lateral angular acceleration $\alpha_y$ (pitch acceleration).

Referring now to FIG. 9, it shows schematically the input and output data of the motion-determining unit 9 according to a second and third variant of the inventive method. FIG. 9 differs from FIG. 8 in that the motion-determining unit 9 determines the velocity at the center of gravity $v_{COG}$ and the acceleration at the center of gravity $a_{COG}$ additionally with the aid of the separately determined longitudinal angular velocity $\omega_x$ and/or of a separately determined, additional vertical acceleration $a_{zj}$ outside the center of gravity.

In principle, a vehicle or a device with only three wheels, or three spring elements, three shock absorbers and three height sensors, is also possible in an analogous manner, instead of the previously described motor vehicle 1.

In conclusion, with the aid of the previously described method the motion of the center of gravity can be determined without the three further vertical acceleration sensors usually employed. In this way the susceptibility of the system to failure is reduced.

As will be appreciated by one of ordinary skill in the art, the methods described in FIGS. 3-4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a vehicle, comprising:
adjusting a damper in response to a vertical acceleration of a vehicle body, a longitudinal angular acceleration of the vehicle body, and a lateral angular acceleration of the vehicle body provided via damping currents of a plurality of shock absorbers and positions of the plurality of shock absorbers and determined via an inverse mass matrix.

2. The method of claim 1, where the vertical acceleration of the vehicle body, the longitudinal angular acceleration of the vehicle body, and the lateral angular acceleration of the vehicle body are provided via additional parameters including longitudinal acceleration of the vehicle body, lateral acceleration of the vehicle body, a mass of the vehicle body, and two moments of inertia of the vehicle body.

3. The method of claim 2, further comprising differentiating positions of the plurality of shock absorbers to provide a plurality of vertical velocities for the vehicle body.

4. The method of claim 2, where the mass of the vehicle body is adjusted in response to a braking force or a torque accelerating the vehicle.

5. The method of claim 1, where adjusting the damper in response to the vertical acceleration of the vehicle body, the longitudinal angular acceleration of the vehicle body, and the lateral angular acceleration of the vehicle body includes adjusting a damping current in response to vertical forces acting on the plurality of shock absorbers.

6. A method for operating a vehicle, comprising:
adjusting a damper in response to a vertical acceleration, a longitudinal angular acceleration, and a lateral angular acceleration provided via a mass of a vehicle body, two moments of inertia of the vehicle body, positions of a plurality of shock absorbers relative to a center of gravity of the vehicle body, a mean height of a longitudinal axis of rotation of the vehicle body, a mean height of a transverse axis of rotation of the vehicle body, damping forces of the plurality of shock absorbers, and spring forces of a plurality of spring elements coupled to the vehicle body.

7. The method of claim 6, further comprising adjusting spring rates of the plurality of spring elements in response to the vertical acceleration, the longitudinal angular acceleration, and the lateral angular acceleration.

8. The method of claim 6, further comprising determining a longitudinal acceleration of the vehicle body and a lateral acceleration of the vehicle body, and where the vertical acceleration, the longitudinal angular acceleration, and the lateral angular acceleration are determined via the lateral acceleration of the vehicle body and the longitudinal acceleration of the vehicle body.

9. The method of claim 6, further comprising adjusting the damper in response to a vertical velocity of the vehicle body.

10. The method of claim 6, further comprising measuring vertical deflections of the plurality of spring elements, and where damping currents of the plurality of shock absorbers, velocities of vertical deflections of the plurality of spring elements, spring constants of the plurality of spring elements, and damping curves of the plurality of shock absorbers are provided.

11. The method of claim 10, where damping forces of the plurality of shock absorbers and spring forces of the plurality of spring elements are provided via damping currents of the plurality of shock absorbers, vertical deflections of the plurality of spring elements, velocities of vertical deflections of the plurality of spring elements, spring constants of the plurality of spring elements, and damping curves of the plurality of shock absorbers.

12. The method of claim 6, where the vehicle body includes four shock absorbers and four height sensors.

13. The method of claim 6, where the vehicle includes a plurality of wheels, a suspension system equipped with at least two shock absorbers and at least two height sensors.

14. The method of claim 6, further comprising adjusting damping currents of the plurality of shock absorbers and spring constants of the plurality of spring elements as a function of the vertical acceleration, the longitudinal angular acceleration, and the lateral angular acceleration.

15. A wheel suspension system connected to a vehicle body, comprising:
   at least three spring elements;
   at least three height sensors;
   at least three shock absorbers; and
   a controller, the controller including instructions for adjusting damping rates of the at least three shock absorbers responsive to vertical acceleration, longitudinal angular acceleration, and lateral angular acceleration of the vehicle body, the vertical acceleration, longitudinal angular acceleration, and lateral angular acceleration of the vehicle body provided solely via the at least three height sensors and damping forces of the at least three shock absorbers, spring forces of the at least three spring elements, mass of the vehicle body, two moments of inertia of the body, a mean height of a longitudinal axis of rotation of the vehicle body, and a mean height of a transverse axis of rotation of the vehicle body.

16. The wheel suspension system of claim 15, further comprising additional instructions for adjusting spring rates of the at least three spring elements.

17. The wheel suspension system of claim 16, where spring rates of the at least three spring elements are based on vertical acceleration, longitudinal angular acceleration, and lateral angular acceleration of the vehicle body.

18. The wheel suspension system of claim 15, where the controller includes additional instructions for adjusting damping rates of the at least three shock absorbers responsive to road surface irregularities.

19. The wheel suspension system of claim 15, where the controller includes additional instructions for adjusting spring rates of the at least three spring elements responsive to road surface irregularities.

* * * * *